(12) United States Patent
Kurokawa et al.

(10) Patent No.: US 7,268,808 B2
(45) Date of Patent: Sep. 11, 2007

(54) DIGITAL CAMERA FOR RECORDING OBJECT SCENE IMAGE WITH IMAGE QUALITY ADJUSTING VALUE

(75) Inventors: Mitsuaki Kurokawa, Osaka (JP); Hiroshi Tsunoda, Osaka (JP); Hideshi Oeda, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 700 days.

(21) Appl. No.: 10/327,060

(22) Filed: Dec. 24, 2002

(65) Prior Publication Data
US 2003/0117504 A1 Jun. 26, 2003

(30) Foreign Application Priority Data
Dec. 26, 2001 (JP) .............................. 2001-393014

(51) Int. Cl.
H04N 5/76 (2006.01)
H04N 5/228 (2006.01)
H04N 5/225 (2006.01)

(52) U.S. Cl. .............................. 348/231.3; 348/222.1; 348/207.1

(58) Field of Classification Search ............. 348/231.3, 348/231.5
See application file for complete search history.

(56) References Cited

U.S. PATENT DOCUMENTS 5,528,293 A * 6/1996 Watanabe ................ 348/231.2
5,724,579 A * 3/1998 Suzuki ..................... 348/231.2
5,978,016 A * 11/1999 Lourette et al. .......... 348/231.6
6,567,119 B1 * 5/2003 Parulski et al. .......... 348/231.3
6,642,930 B1 * 11/2003 Matsuura et al. ............ 382/167

FOREIGN PATENT DOCUMENTS

JP       05-260510        10/1993
JP       11-313279      * 11/1999
JP       2001-251551 A    9/2001

* cited by examiner

Primary Examiner—David Ometz
Assistant Examiner—Nhan T. Tran
(74) Attorney, Agent, or Firm—Westerman, Hattori, Daniels & Adrian, LLP.

(57) ABSTRACT

A digital camera includes an image sensor. Image data of an object photographed by the image sensor is subjected to a color adjustment on the basis of color adjustment values set to a signal processing circuit. If a shutter button is operated, an image file including the image data and the color adjustment values set to the signal processing circuit is recorded into a memory card. When the memory card is attached to a PC, and a color reproduction characteristic of the image data included in the image file is adjusted by the PC, the color adjustment values are, in company therewith, also changed. When the memory card is returned to the digital camera, a change in the color adjustment values is detected by a CPU, and the color adjustment values set to the signal processing circuit is overwritten by the color adjustment values included in the image file.

14 Claims, 11 Drawing Sheets

| N | HUE (H) | CHROMA (C) | LUMINANCE (L) | COLOR |
|---|---|---|---|---|
| 1 | 55 | 690 | 184.515 | Mg |
| 2 | 118 | 530 | 121.845 | R |
| 3 | 160 | 610 | 184.893 | Ye |
| 4 | 225 | 780 | 126.177 | G |
| 5 | 275 | 610 | 94.075 | Cy |
| 6 | 338 | 610 | 187.512 | B |

| N | HUE (H) | CHROMA (C) | LUMINANCE (L) | COLOR |
|---|---|---|---|---|
| 1 | 48 | 530 | 184.154 | Mg |
| 2 | 115 | 720 | 96.69 | R |
| 3 | 163 | 690 | 160.774 | Ye |
| 4 | 223 | 900 | 84.193 | G |
| 5 | 280 | 700 | 73.102 | Cy |
| 6 | 340 | 540 | 189.011 | B |

DIGITAL CAMERA FOR RECORDING OBJECT SCENE IMAGE WITH IMAGE QUALITY ADJUSTING VALUE

BACKGROUND OF THE INVENTION

1. Field of the Invention

The present invention relates to a digital camera. More specifically, the present invention relates to a digital camera that subjects a photographed image signal to an image quality adjustment on the basis of an image quality adjustment value set to a memory.

2. Description of the Prior Art

An image quality changes depending upon what image adjustments are subjected to an image signal. This resulted in a conventional digital camera, in which the image signal outputted from an image sensor is subjected to an image quality adjustment on the basis of an image quality adjustment value stored in a memory, and the image quality adjustment value is changeable on a monitor screen. In a background of an image quality adjustment menu, a through image (real time moving image) is displayed, and if the image quality adjustment value is changed, the image quality of the through image is changed. However, a monitor provided on the digital camera is limited in size, and only the image in low resolution is displayable on the monitor, thus not possible to exactly adjust the image quality.

SUMMARY OF THE INVENTION

Therefore, it is a primary object of the present invention to provide a digital camera capable of exactly adjusting an image quality of a photographed image.

According to the present invention, a digital camera that subjects a photographed image signal to an image quality adjustment on the basis of an image quality adjustment value set to a memory, comprises: a recorder for recording into a recording medium an image file including the photographed image signal and the image quality adjustment value set to the memory upon receipt of a recording instruction; a determiner for determining whether or not the image quality adjustment value included in the image file is changed; and an overwriter for overwriting the image quality adjustment value set to the memory by the image quality adjustment value included in the image file depending upon a determination result of the determiner.

The photographed image signal is subjected to the image quality adjustment on the basis of the image quality adjustment value set to the memory. Upon receipt of the recording instruction, the image file including the photographed image signal and the image quality adjustment value set to the memory is recorded into the recording medium by the recorder. Whether or not the image quality adjustment value included in the image file is changed is determined by the determiner. The overwriter overwrites the image quality adjustment value set to the memory by the image quality adjustment value included in the image file depending upon the determination result of the determiner.

The image quality adjustment value, together with the photographed image signal, is stored in the image file, thus becoming possible to adjust an image quality of the photographed image signal and change the image quality adjustment value in response to the adjustment by fetching the image file into a PC, for example. When the image quality adjustment value is thus changed, the image quality adjustment value stored in the memory is overwritten by the changed image quality adjustment value. Due to this, it is possible to reflect the changed image quality adjustment value on the image quality adjustment of the photographed image signal. That is, it becomes possible to exactly adjust the image quality of the photographed image signal as a result of a mechanism recording the image quality adjustment value into the image file, and a mechanism overwriting the image quality adjustment value set to the memory by the image quality adjustment value within the image file.

The determiner preferably determines that the image quality adjustment value is changed when a specific marker is included in the image file. It is possible to determine whether or not the image quality adjustment value is changed on the basis of the specific marker if the PC is to write the specific marker into the image file at a time of changing the image quality adjustment value.

In a case that a plurality of the image quality adjustment values which respectively correspond to a plurality of image quality adjustment modes are set to the memory, the recorder creates a file header including image quality adjustment mode information and the image quality adjustment value, and records into the recording medium the image file including the file header and the photographed image signal. Furthermore, the overwriter specifies the image quality adjustment value to be overwritten from the memory on the basis of the image quality adjustment mode information included in the file header, and overwrites the specified image quality adjustment value by the image quality adjustment value included in the file header. This makes it possible to prepare a plurality of the preferred image quality adjustment values in the memory.

It is noted that if the recording medium is rendered detachable, there is no need any longer that the digital camera and the PC are connected by a cable, or the like. This enhances operability.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
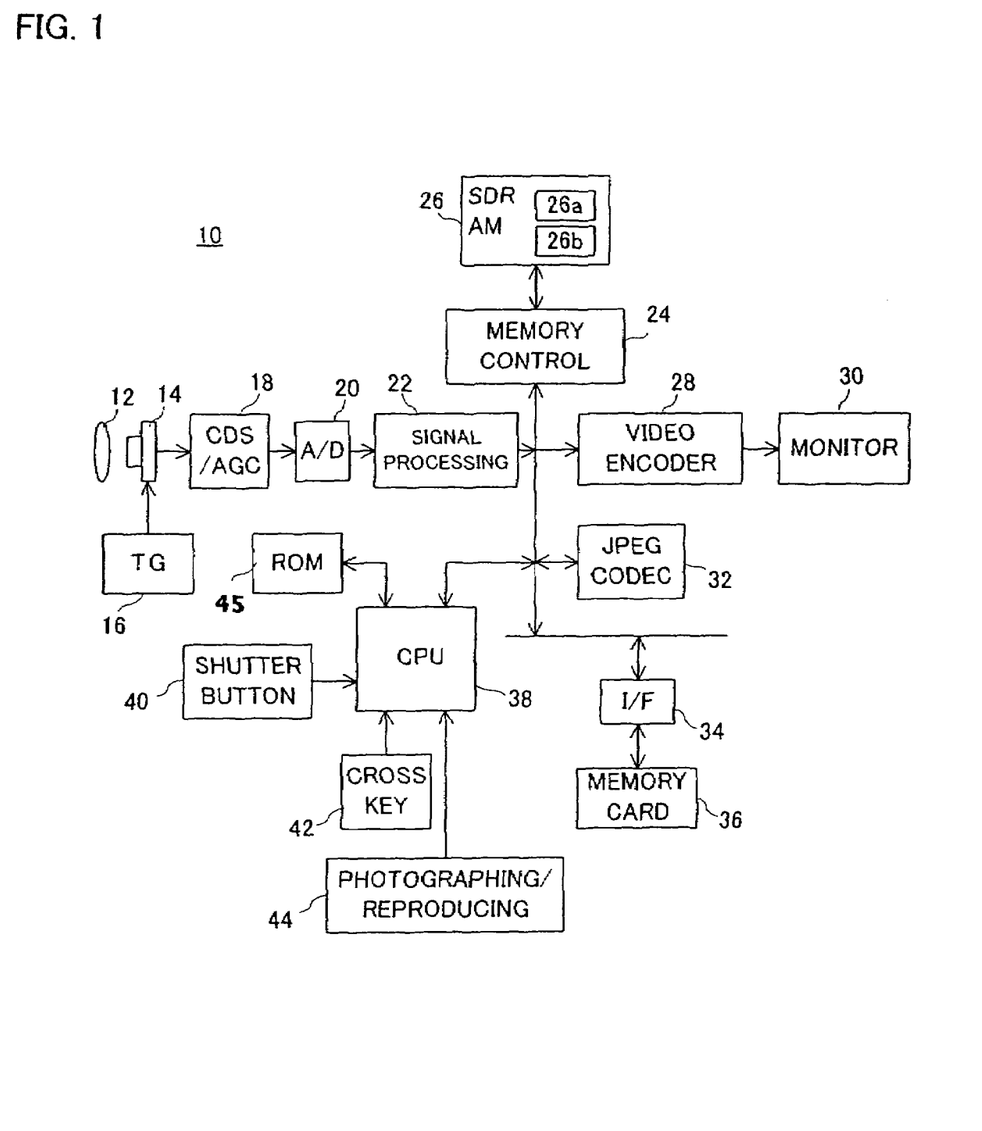
FIG. 1 is a block diagram showing one embodiment of the present invention.

Referring to FIG. 1, a digital camera 10 in this embodiment includes a focus lens 12. An optical image of an object is incident on a light-receiving surface of an image sensor 14 via the focus lens 12. On the light-receiving surface, a camera signal (raw image signal) corresponding to the incident optical image is generated by photoelectronic conversion. It is noted that the light-receiving surface is covered by a color filter of the Bayer pattern (not shown), and each pixel signal forming the camera signal has only any one of color components R, G, and B.

If a photographing mode is selected by a photographing/reproducing change switch 44, a process instruction is applied from a CPU 38 to a timing generator (TG) 16, and the image sensor 14 is driven by the TG 16. The image sensor 14 repeatedly reads out the camera signal generated by the photoelectronic conversion at a predetermined frame rate. The read camera signal of each frame is converted into a digital signal by an A/D converter 20 via a well-known noise removal and a level adjustment in a CDS/AGC circuit 18.

A signal processing circuit 22 subjects camera data of each frame outputted from the A/D converter 20 to signal processes such as color separation, a white balance adjustment, a color adjustment (color tone correction), a YUV conversion, and so on in response to a process instruction from the CPU 38 so as to generate image data formed of a luminance component (Y data) and color difference components (U data, V data). Generated image data is applied to a memory control circuit 24, and written into an image data storing area 26a of an SDRAM 26 by the memory control circuit 24.

A video encoder 28 causes the memory control circuit 24 to read out the image data in the image data storing area 26a in response to a process instruction from the CPU 38. Then, the read image data of each frame is encoded into a composite image signal in an NTSC format, and the encoded composite image signal is supplied to a monitor 30. On the monitor 30, a through image of the object is displayed.

If a shutter button 40 is depressed by an operator, the CPU 38 applies a compression instruction to a JPEG CODEC 32. The JPEG CODEC 32 causes the memory control circuit 24 to read out one frame of the image data stored in the image data storing area 26a, and applies a JPEG compression to the read image data. Upon obtaining the compressed image data, the JPEG CODEC 32 applies generated compressed image data to the memory control circuit 24. The compressed image data is stored into a compressed data storing area 26b by the memory control circuit 24.

Upon completion of a storing process of the compressed image date, the CPU 38, in addition to reading out the compressed image data from the compressed data storing area 26b through the memory control circuit 24, creates by itself header information (Exif information) including reference values, target values, and mode information described later. Then, the image file in which the header information and the compressed image data are stored is recorded into a memory card 36 through an I/F circuit 34. It is noted that the memory card 36 is a detachable non-volatile recording medium, and becomes accessible by the CPU 38 when attached to a slot (not shown).

When a reproduction mode is selected by the photographing/reproducing change switch 44, the CPU 38 detects the image file to be reproduced from the memory card 36, reads out the compressed image data stored in the image file through the I/F circuit 34, and stores the read compressed image data into the compressed data storing area 26b of the SDRAM 26 through the memory control circuit 24. In addition, the CPU 38 applies an expansion instruction to the JPEG CODEC 32.

The JPEG CODEC 32 reads out the compressed image data from the compressed data storing area 26b through the memory control circuit 24 so as to subject a JPEG expansion to the read compressed image data. The resultant expanded image data is written into the image data storing area 26a through the memory control circuit 24.

The CPU 38 has applied a process instruction to the video encoder 28 prior to detecting the image file, and the image data stored in the image data storing area 26a is read out by the video encoder 28. The video encoder 28 converts the read image data into a composite image signal, and supplies the converted composite image signal to the monitor 30. As a result thereof, a reproduced image is displayed on the monitor 30.

Furthermore, the CPU 38 reads out the header information from the image file related to the reproduction, and determines whether or not a specific marker is present in the read header information. If the specific marker is detected, the mode information and the target values are retrieved from the header information, and the target values are set to a target value table (described later) provided in the signal processing circuit 22 and corresponding to the mode information.

It is noted that the image file to be reproduced is updated in response to an operation of a cross key 42, and the reproduced image displayed on the monitor 30 is also updated in company therewith.

Figure 2:
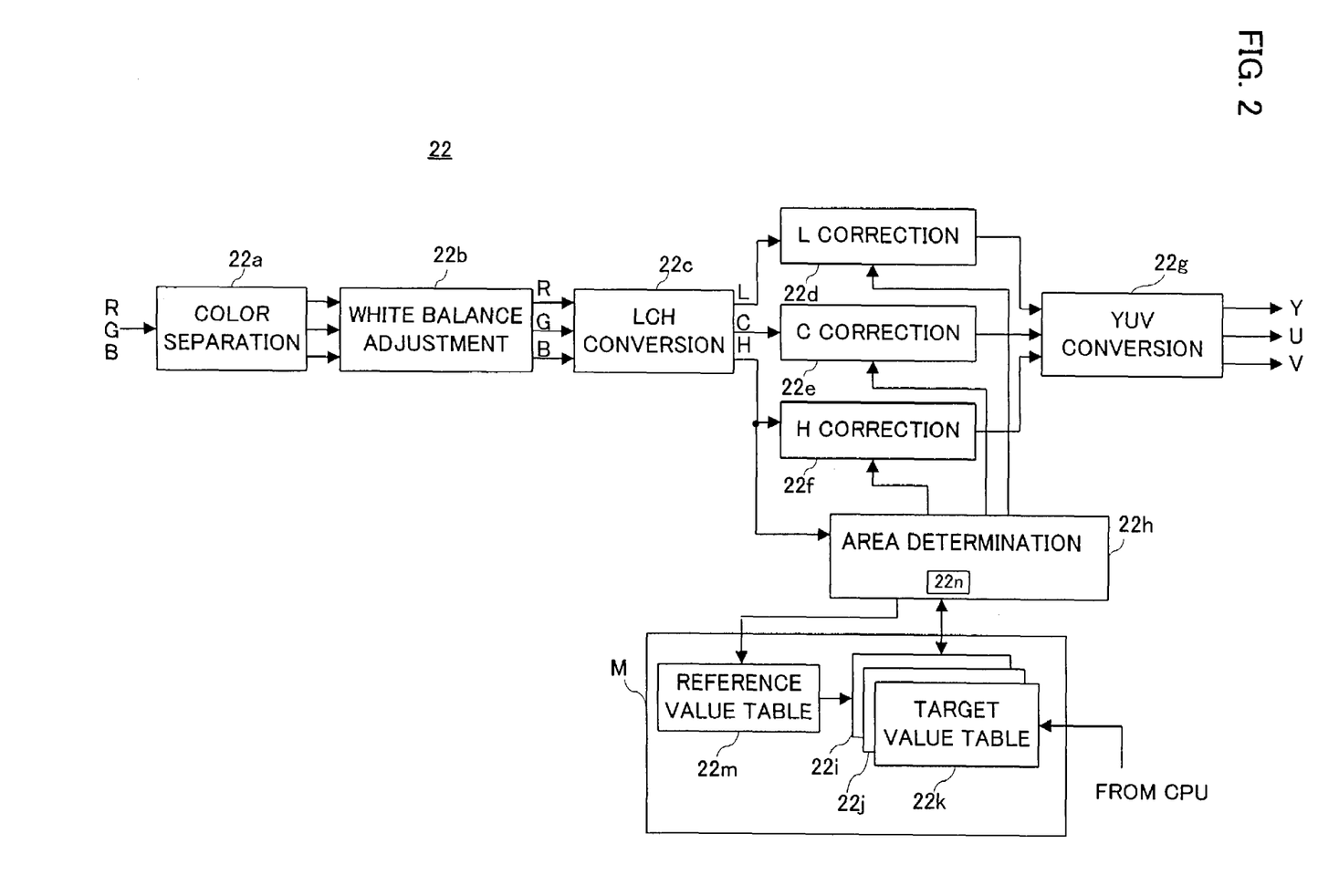
FIG. 2 is a block diagram showing one example of a signal processing circuit.

The signal processing circuit 22 is structured as shown in FIG. 2. The camera data outputted from the A/D converter 20 is subjected to the color separation by a color separating circuit 22a. That is, each pixel data constituting the camera data has only any one of an R element, a G element, and a B element so that two color elements that each pixel lacks is compensated by the color separation circuit 22a. The R element, the G element, and the B element forming each pixel are simultaneously outputted from the color separation circuit 22a. The R element, the G element, and the B element outputted by each one pixel are applied to an LCH conversion circuit 22c via a white balance adjusting circuit 22b, and converted into an L element (luminance element), a C element (chroma element), and an H element (hue element).

The converted L element, the C element, and the H element are applied to an L correction circuit 22d, a C correction circuit 22e, and an H correction circuit 22f, respectively. The L correction circuit 22d, the C correction circuit 22e, and the H correction circuit 22f subject the inputted L element, the C element, and the H element to predetermined operations, respectively so as to evaluate a corrected L element, a corrected C element, and a corrected H element. The evaluated corrected L element, the corrected C element, and the corrected H element are converted into a Y component, a U component, and a V component by the YUV conversion circuit 22g later, and the converted Y component, the U component, and the V component are outputted from the signal processing circuit 22. It is noted that the YUV conversion circuit 22g applies a so-called 4:2:2 conversion (or 4:1:1 conversion), and the Y component, the U component, and the V component outputted from the signal processing circuit 22 have a ratio of 4:2:2 (or 4:1:1).

The H component outputted from the LCH conversion circuit 22c is also applied to an area determination circuit 22h. By reference to a reference table 22m, the area determination circuit 22h determines an area to which the H component applied from the LCH conversion circuit 22c belongs. Then, in addition to reading out reference values corresponding to a determination result from the reference value table 22m, target values corresponding to the determination result is read out from one of target value tables 22i-22k. Operations by the L correction circuit 22d, the C correction circuit 22e, and the H correction circuit 22f are performed on the basis of the read reference values and the target values.

Figure 3:
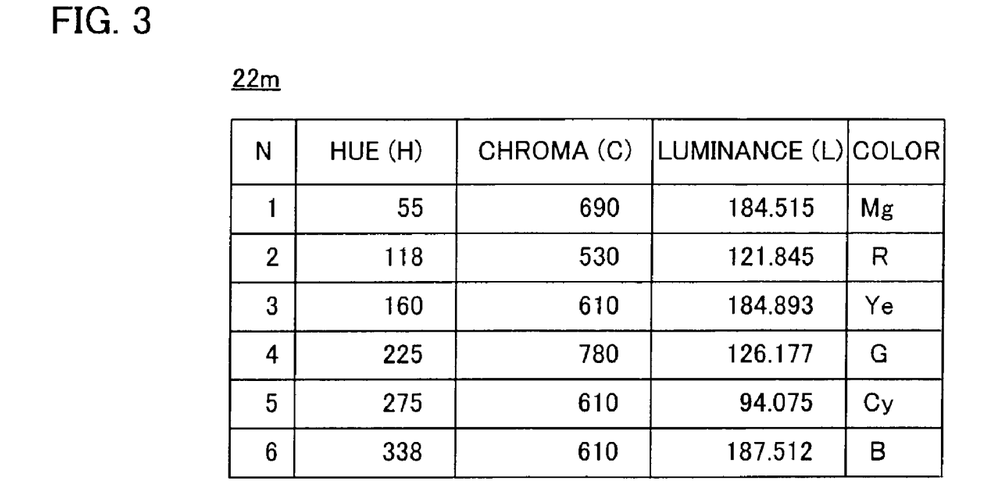
FIG. 3 is an illustrative view showing one example of a reference value table.
Figure 5:
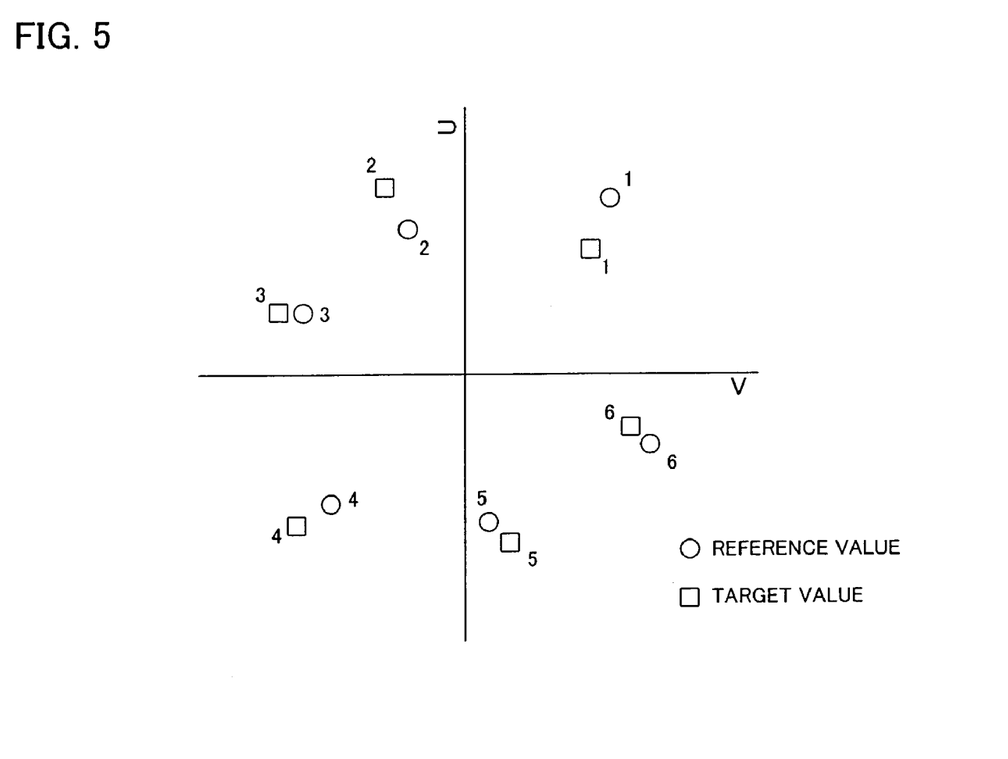
FIG. 5 is an illustrative view showing one example of a distributed state of reference values and target values.
Figure 6:
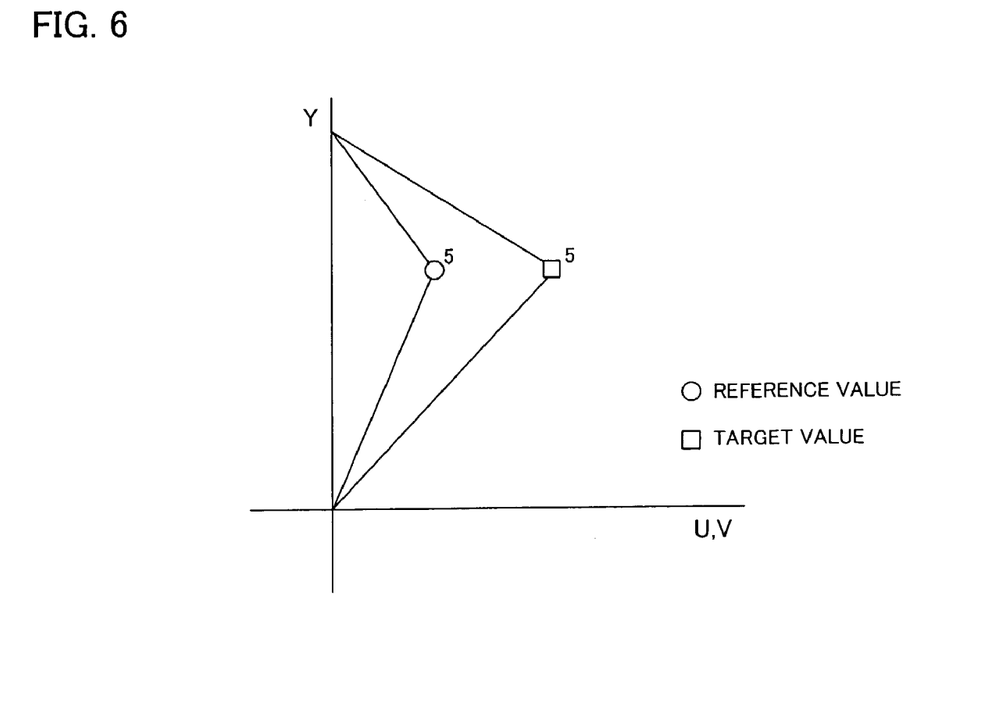
FIG. 6 is an illustrative view showing another example of a distributed state of the reference values and the target values.

Referring to FIG. 3, six reference H component values, six reference C component values, and six reference L component values are written on the reference value table 22m. H, C, and L mean hue, chroma, and luminance, respectively, and each is a parameter for a color adjustment. An identical reference value number N (=1-6) is assigned to the reference H component value, the reference C component value, and the reference L component value to be associated with each other, and the reference value is defined by three component values (the reference H component value, the reference C component value, and the reference L component value) having the common reference value number. The six reference values are distributed in a YUV space as shown in FIG. 5 and FIG. 6. It is noted that only the reference value having the reference value number "5" is shown in FIG. 6.

Figure 4:
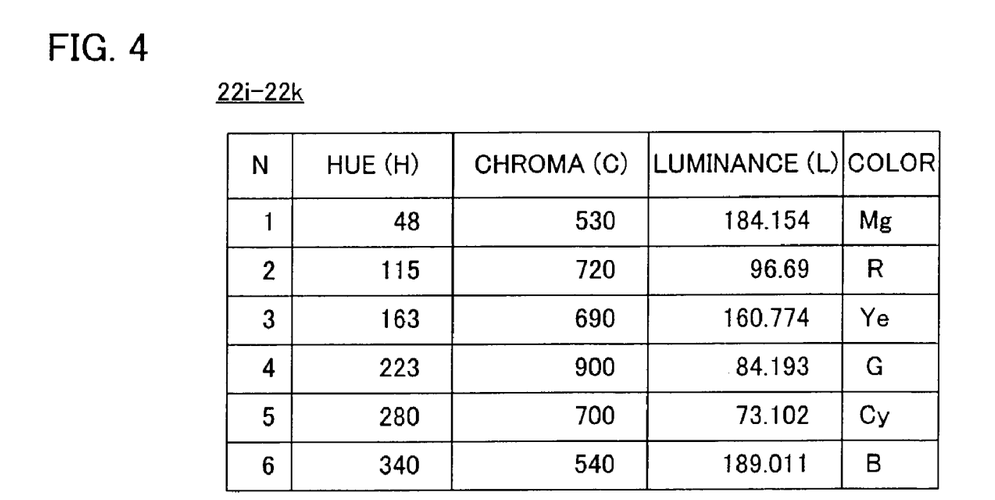
FIG. 4 is an illustrative view showing one example of a target value table.

On the other hand, the target value tables 22i-22k are formed as shown in FIG. 4. Similar to the reference value table 22m shown in FIG. 3, six target H component values, six target C component values, and six target L component values respectively regarding the hue (H), the chroma (C), and the luminance (L) are set, and the target value is defined by the target H component value, the target C component value, and the target L component value assigned to the identical target value number N (=1-6). When the target H component values, the target C component values, and the target L component values show numerical values shown in FIG. 4, the six target values are distributed in the YUV space as shown in FIG. 5 and FIG. 6. It is noted that only the target value having the target value number "5" is shown in FIG. 6.

The target value tables 22i-22k differ from the reference value table 22m in that each target value can be changed. That is, the reference H component values, the reference C component values, and the reference L component values set to the reference value table 22m are previously set in manufacture, thus not possible to be freely changed by an operator. In contrary thereto, the target H component values, the target C component values, and the target L component values set to the target value tables 22i-22k are arbitrarily changeable by the operator.

It is noted that both the reference value table 22h, and the target value tables 22i-22k are stored in a non-volatile memory M. In addition, the target value tables 22i-22k correspond to color adjustment modes 1-3, respectively.

Figure 7:
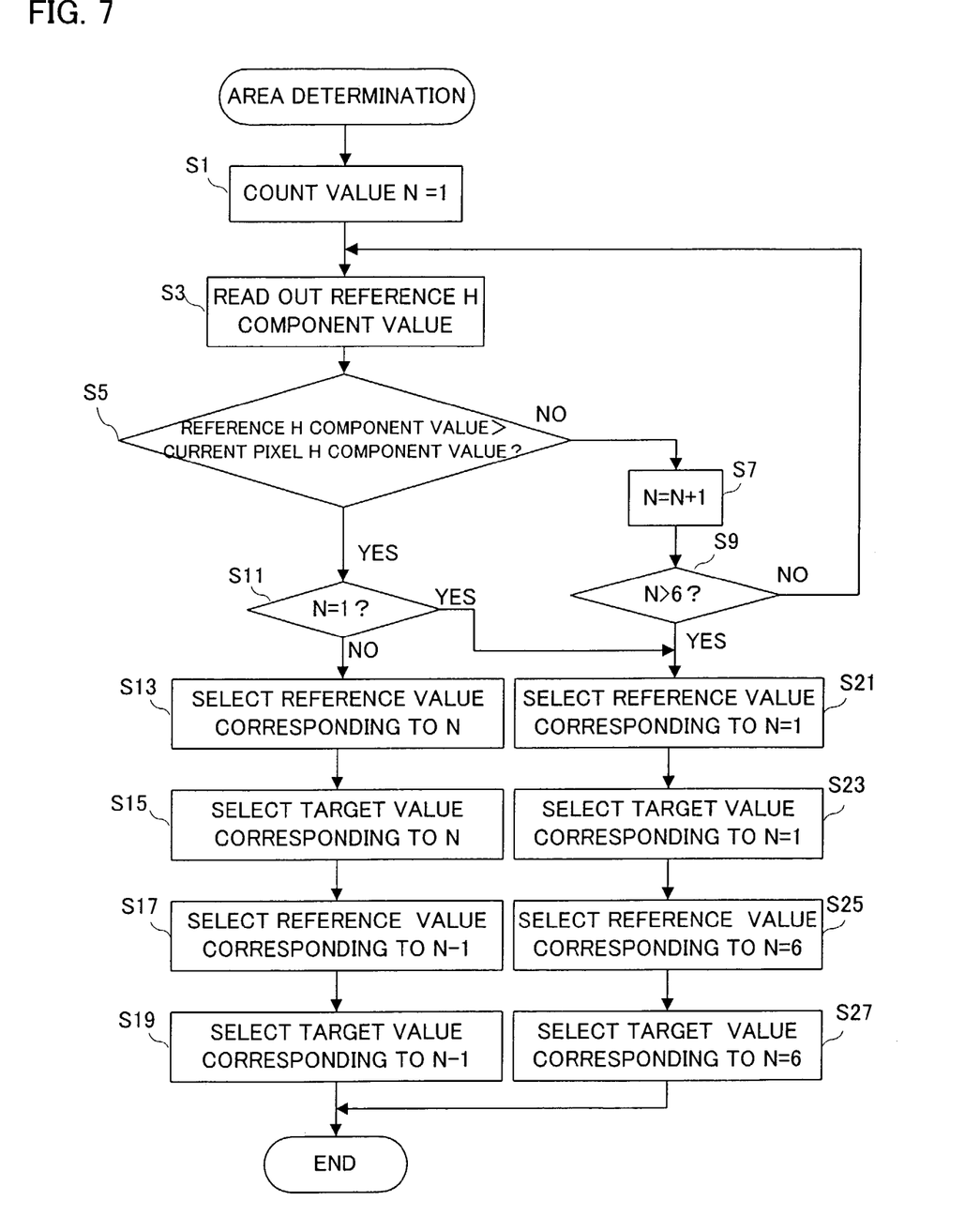
FIG. 7 is a flowchart showing one portion of an operation of an area determination circuit.

The area determination circuit 22h executes a flowchart shown in FIG. 7 by each one pixel in order to carry out an area determination regarding each pixel forming the image data and a selection of the reference values and the target values corresponding to the determination result. Firstly, a count value N of a counter 22n is set to "1" in a step S1, and the reference H component value corresponding to the count value N is read out from the reference value table 22m in a step S3. In a step S5, the H component value of a current pixel inputted from the LCH conversion circuit 22c (current pixel H component value) is compared with the reference H component value read out from the reference value table 22m.

If it is determined that the reference H component value is greater than (>) the current pixel H component value in the step S5, the count value N is compared with "1" in a step S11. Herein, if N is equal to (=) 1, processes of steps S21-S27 are carried out. However, if N is greater than (>) 1, processes of steps S13-S19 are carried out. On the other hand, if the reference H component value is less than or equal to (≦) the current pixel H component value, the counter 22n is incremented in a step S7, and the updated count value N is compared with "6" in a succeeding step S9. Furthermore, if N is less than or equal to (≦) 6, the process returns to the step S3. However, if N is greater than (>) 6, the processes of the steps S21-S27 are carried out.

In the step S13, the reference H component value, the reference C component value, and the reference L component value corresponding to the current count value N are selected as Hr1, Cr1, and Lr1 from the reference value table 22m, and the target H component value, the target C component value, and the target L component value corresponding to the current count value N are selected as Ht1, Ct1, and Lt1 from any one of the target value tables 22i-22k (table corresponding to the current color adjustment mode) in the step S15. Furthermore, the reference H component value, the reference C component value, and the reference L component value corresponding to a count value N minus (−) 1 are selected as Hr2, Cr2, and Lr2 from the reference value table 22m in the step S17, and the target H component value, the target C component value, and the target L component value corresponding to the count value N minus (−) 1 are selected as Ht2, Ct2, and Lt2 from any one of the target value tables 22i-22k (table corresponding to the current color adjustment mode) in the step S19.

On the other hand, the reference H component value, the reference C component value, and the reference L component value corresponding to a count value N equal to (=) 1 are selected as Hr1, Cr1, and Lr1 from the reference table 22m in the step S21, and the target H component value, the target C component value, and the target L component value corresponding to a count value N equal to (=) 0 are selected as Ht1, Ct1, and Lt1 from any one of the target value tables 22i-22k (table corresponding to the current color adjustment mode) in the step S23. In addition, the reference H component value, the reference C component value, and the reference L component value corresponding to a count value N equal to (=) 6 are selected as Hr2, Cr2, and Lr2 from the reference value table 22m in the step S25, and the target H component value, the target C component value, and the target L component value corresponding to the count value N equal to (=) 6 are selected from any one of the target value tables 22i-22k as Ht2, Ct2, and Lt2 (table corresponding to the current color adjustment mode) in the step S27.

Thus, the two reference values sandwiching the current pixel value regarding the hue and the two target values corresponding to the two reference values are detected.

The reference H component values Hr1 and Hr2, and the target H component values Ht1 and Ht2 are applied to the H correction circuit 22f. In addition, the reference C component values Cr1 and Cr2, and the target C component values Ct1 and Ct2 are applied to the C correction circuit 22e. Furthermore, the reference L component values Lr1 and Lr2, and the target L component values Lt1 and Lt2 are applied to the L correction circuit 22d.

Figure 8:
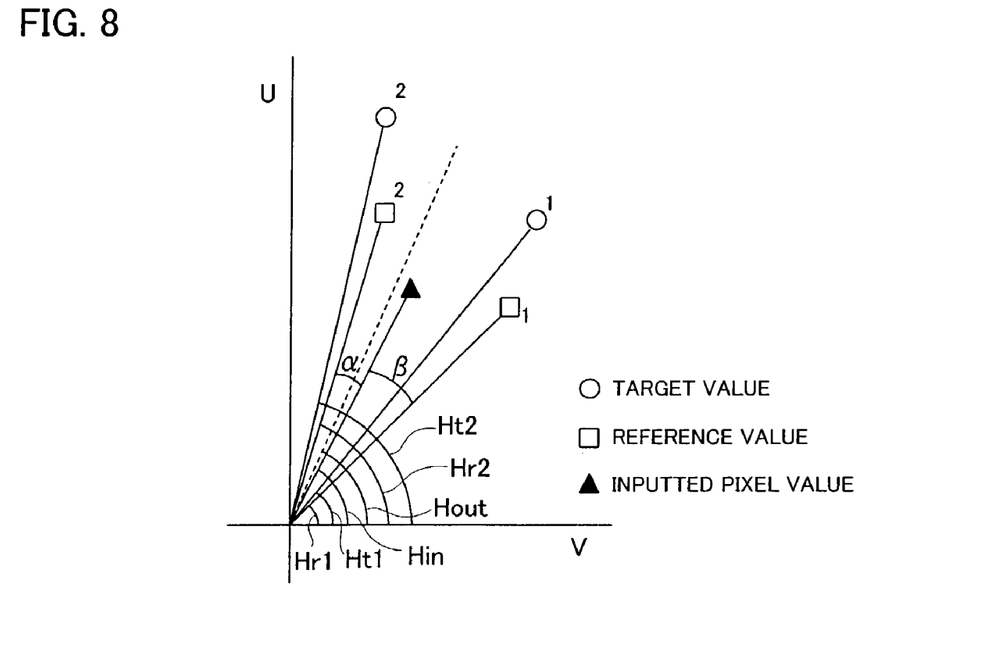
FIG. 8 is an illustrative view showing one portion of an operation of the FIG. 1 embodiment.

The H correction circuit 22f fetches a current pixel H component value Hin from the LCH conversion circuit 22c, and calculates a corrected H component value Hout according to Equation 1. The calculated corrected H component value Hout is shifted toward a degree indicated by a dotted line shown in FIG. 8.

$$Hout=(Ht2 \cdot \beta + Ht1 \cdot \alpha)/(\alpha+\beta) \qquad \text{[Equation 1]}$$

$\alpha = |Hr2-Hin|$
$\beta = |Hr1-Hin|$

The H correction circuit 22f, in addition to outputting degree data $\alpha(=|Hr2-Hin|)$ and $\beta(=|Hr1-Hin|)$ to the C correction circuit 22e and the L correction circuit 22d, outputs degree data $\gamma(=|Ht2-Hout|)$ and $\delta(=|Ht1-Hout|)$ to the L correction circuit 22d.

Figure 9:
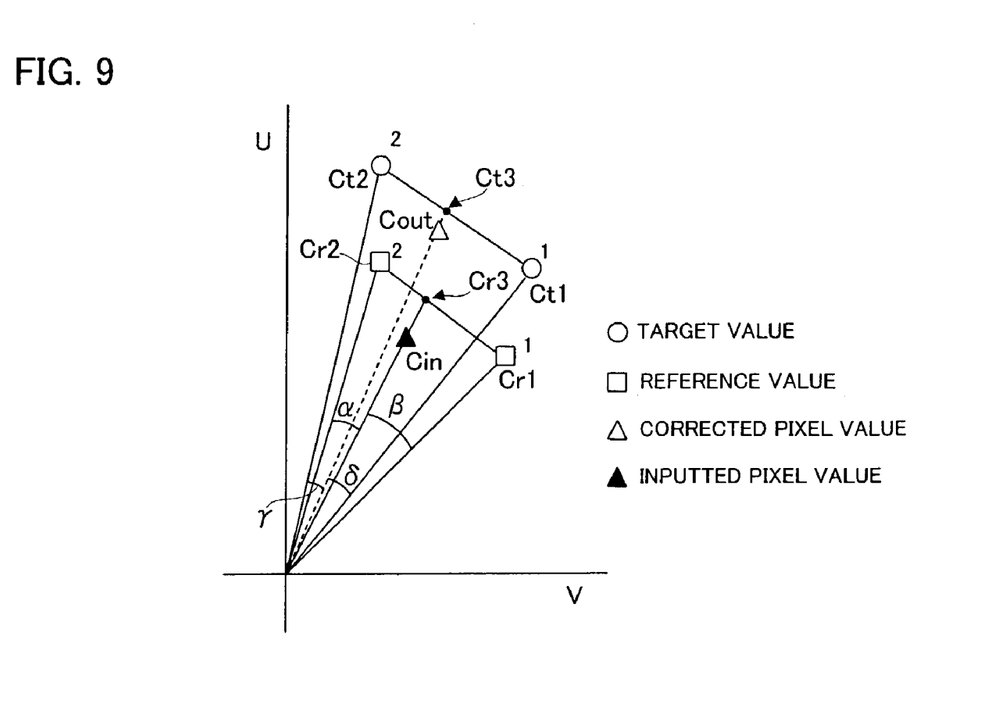
FIG. 9 is an illustrative view showing another portion of the operation of the FIG. 1 embodiment.

The C correction circuit 22e subjects a current pixel C component value Cin fetched from the LCH conversion circuit 22c to a calculation shown in Equation 2 so as to calculate a corrected C component value Cout shown in FIG. 9.

$$Cout=Cin \cdot \{Ct1+(Ct2-Ct1)\cdot\beta/(\alpha+\beta)\}/\{Cr1+(Cr2-Cr1)\cdot\beta/(\alpha+\beta)\} \qquad \text{[Equation 2]}$$

In addition, the C correction circuit 22e performs a calculation of Equation 3 so as to calculate a C component value Cr3 at an intersection coordinate of a straight line that connects CH system coordinates (0,0), (Cin, Hin) and a straight line which connects CH system coordinates (Cr1, Hr1), (Cr2, Hr2), and a C component value Ct3 at an intersection coordinate of a straight line that connects CH system coordinates (0,0), (Cout, Hout) and a straight line which connects CH system coordinates (Ct1, Ht1), (Ct2, Ht2). The calculated C component values Cr3 and Ct3 are outputted to the L correction circuit 22d together with the above-described current pixel C component value Cin and the corrected C component value Cout.

$$Cr3=Cr1+(Cr2-Cr1)\cdot\beta/(\alpha+\beta) \qquad \text{[Equation 3]}$$

$$Ct3=Ct1+(Ct2-Ct1)\cdot\delta/(\gamma+\delta)$$

Figure 10:
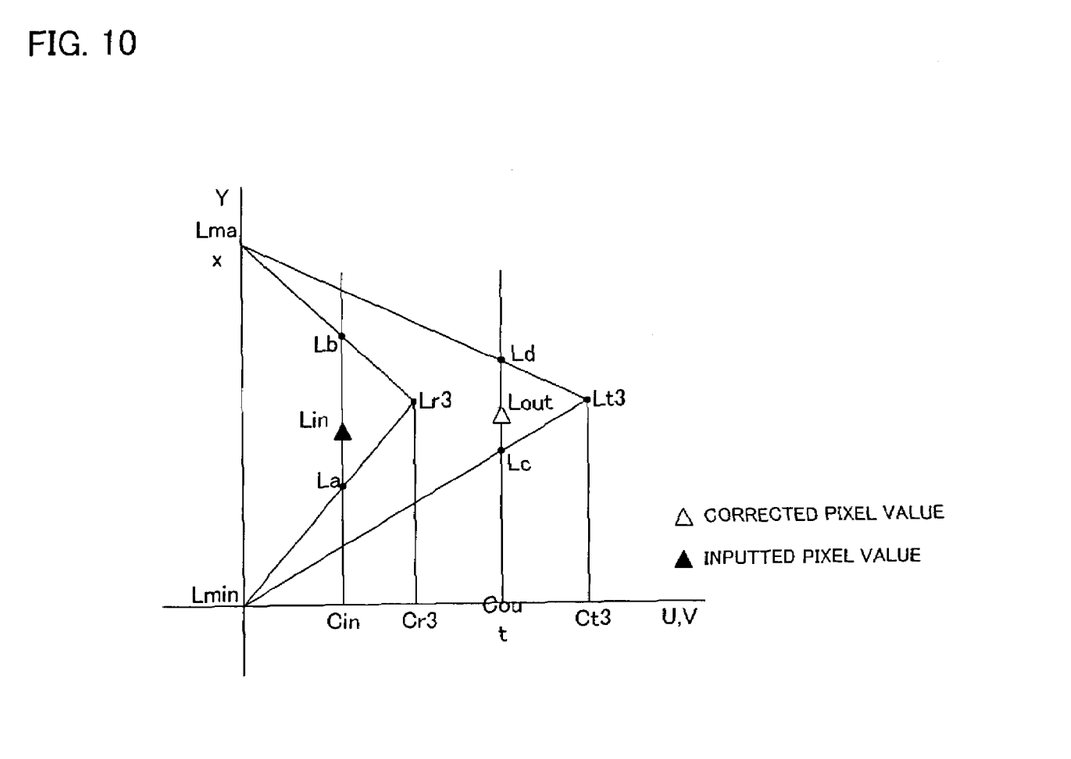
FIG. 10 is an illustrative view showing the other portion of the operation of the FIG. 1 embodiment.

The L correction circuit 22d fetches a current pixel L component value Lin from the LCH conversion circuit 22c so as to evaluate a corrected L component value Lout shown in FIG. 10 according to Equation 4. Lmax and Lmin shown in FIG. 10 are a maximum value and a minimum value of the L (luminance) to be reproduced, respectively. The current pixel value (inputted pixel value) exists on a surface formed by LCH system coordinates (Lmax, 0, 0), (Lmin, 0, 0) and (Lr3, Cr3, Hin) (a surface which cuts down the YUV space by the hue Hin). On the other hand, a corrected pixel value exists on a surface formed by LCH system coordinates (Lmax, 0, 0), (Lmin, 0, 0) and (Lt3, Ct3, Hout) (a surface which cuts down the YUV space by the hue Hout).

$$Lout=(Lin-La)\cdot(Ld-Lc)/(Lb-La)+Lc \qquad \text{[Equation 4]}$$

$$La=Cin/Cr3\cdot(Lr3-Lmin)$$

$$Lb=Cin/Cr3\cdot(Lr3-Lmax)+Lmax$$

$$Lc=Cout/Ct3\cdot(Lt3-Lmin)$$

$$Ld=Cout/Ct3\cdot(Lt3-Lmax)+Lmax$$

$$Lr3=Lr1+(Lr2-Lr1)\cdot\beta/(\alpha+\beta)$$

$$Lt3=Lt1+(Lt2-Lt1)\cdot\delta/(\gamma+\delta)$$

The corrected pixel value is defined by the corrected H component value Hout, the corrected C component value Cout, and the corrected L component value Lout thus evaluated. It is noted that the current pixel value is defined by the current pixel H component value Hin, the current pixel C component value Cin and the current pixel L component value Lin outputted from the LCH conversion circuit 22c.

Figure 11:
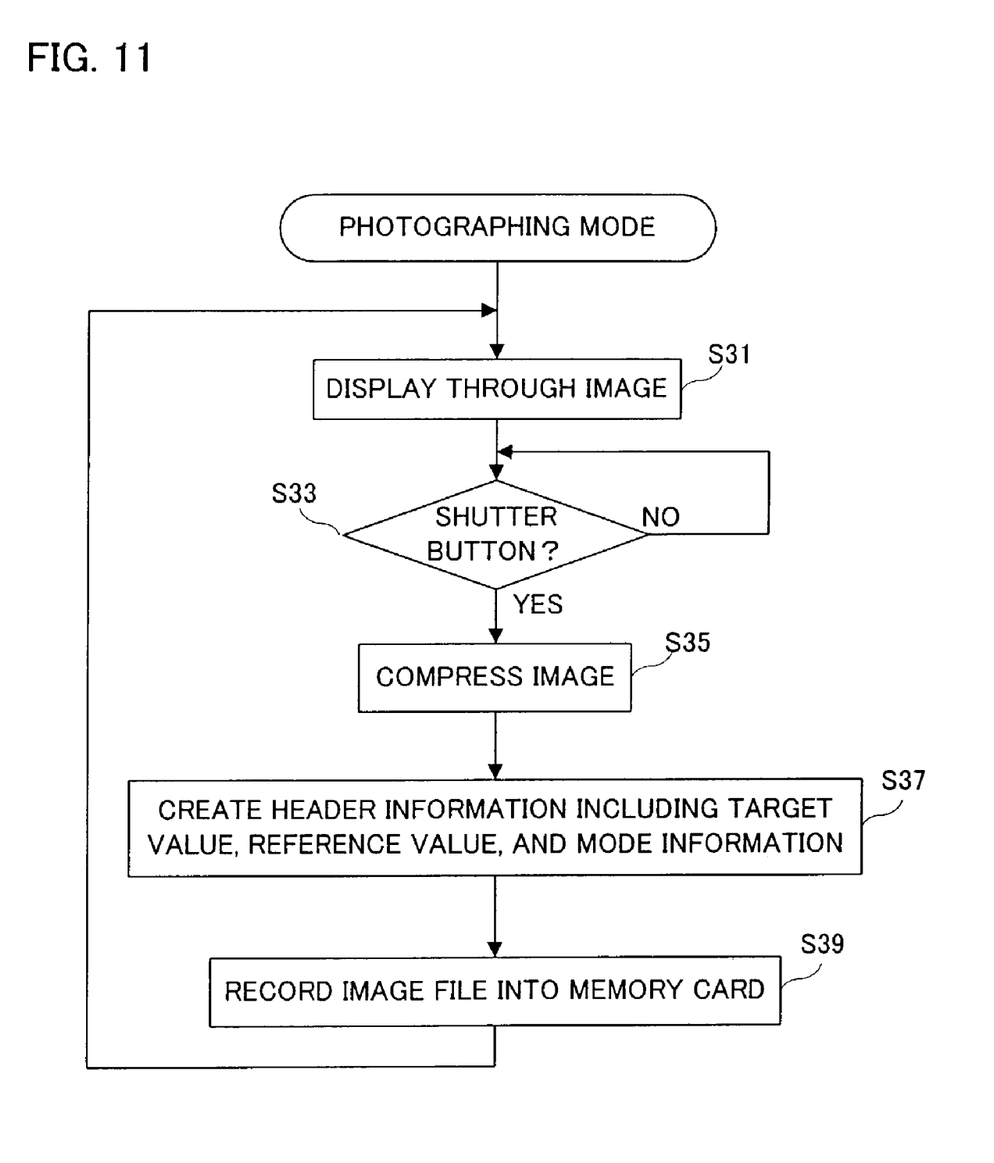
FIG. 11 is a flowchart showing one example of an operation of a CPU in a photographing mode.
Figure 12:
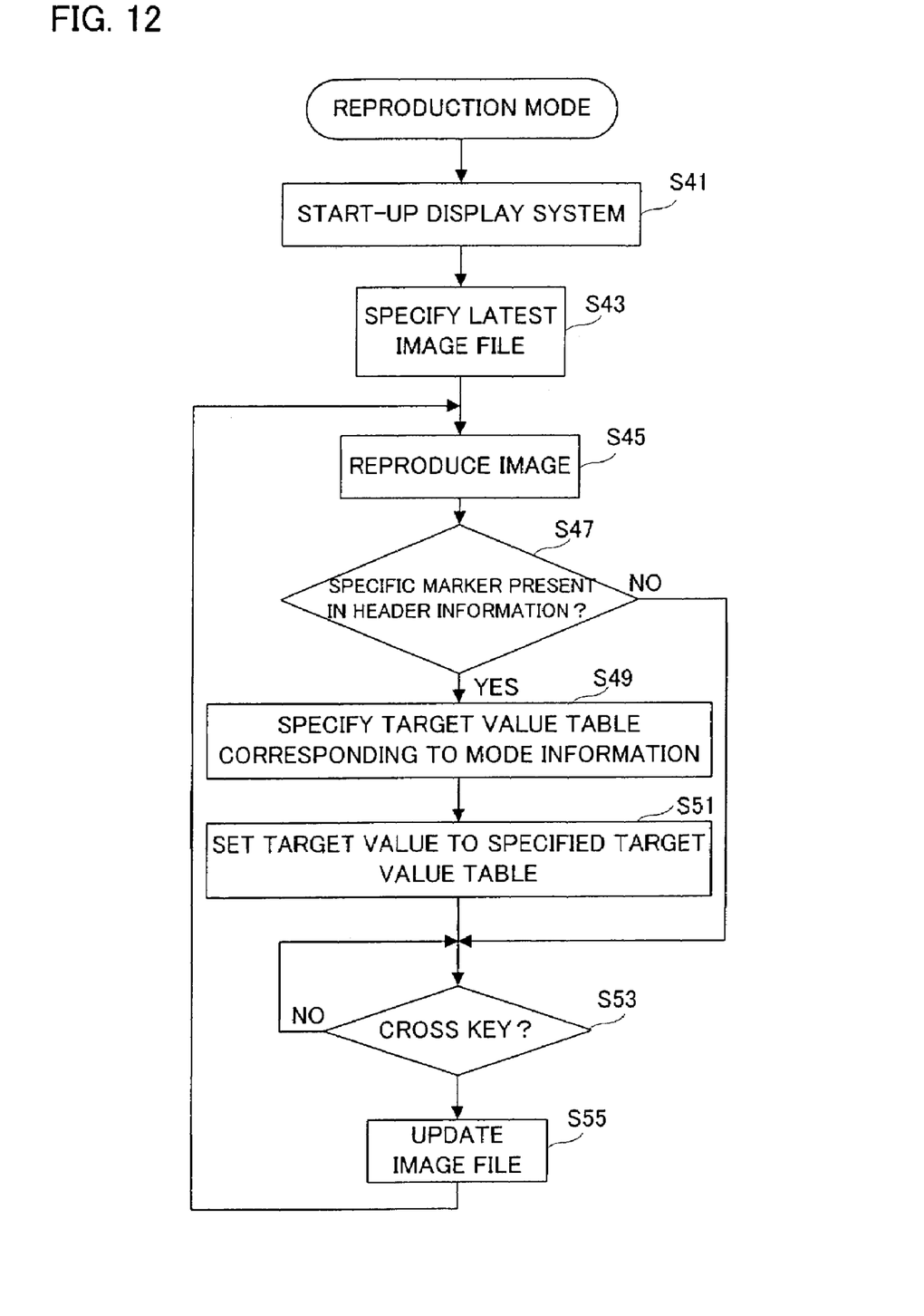
FIG. 12 is a flowchart showing one example of an operation of the CPU in a reproduction mode.

The CPU 38 carries out a flowchart shown in FIG. 11 when the photographing mode is selected, and carries out a flowchart shown in FIG. 12 when the reproduction mode is selected. It is noted that program corresponding to these flowcharts is stored in a ROM 45.

When the photographing mode is selected, a through image display process is carried out in a step S31. More specifically, a process instruction is applied to the TG 16, the signal processing circuit 22, and the video encoder 28. This allows a real time moving image of the object to be displayed on the monitor 30. It is determined whether or not the shutter button 40 is operated in a step S33, and if YES is determined, an image compression process is carried out in a step S35. More specifically, a compression instruction is applied to the JPEG CODEC 32. This allows one frame of the compressed image data to be stored into the compressed data storing area 26b.

In a step S37, six reference values are read out from the reference value table 22m, and six target values are read out from any one of the target value tables 22i-22k (table corresponding to the current color adjustment mode) so as to create header information including the read reference values and the target values, and the mode information showing the current color adjustment mode. In a step S39, the compressed image data is read out from the compressed data storing area 26b through the memory control circuit 24, the image file including the compressed image data and the header information created in the step S37 is created, and the created image file is recorded into the memory card 36 through the I/F circuit 34. The process returns to the step S31 after completing the process.

When the reproduction mode is selected, a process instruction is applied to the video encoder 28 in order to start-up a display system in a step S41, and a latest image file is specified from a plurality of image files recorded in the memory card 36 in a step S43. The specified image file is reproduced in a step S45. More specifically, the compressed image data stored in the image file is read out through the I/F circuit 34, the read compressed image data is written into the compressed data storing area 26b through the memory control circuit 24, and an expansion instruction is applied to the JPEG CODEC 32. The JPEG CODEC 32 reads out the compressed image data through the memory control circuit 24, applies a JPEG expansion to the compressed image data, and the expanded image data is written into the image data storing area 26a through the memory control circuit 24.

In a step S47, the header information is read out from the image file related to the reproduction, and it is determined whether or not the specific marker is present in the header information. If NO is herein determined, the process directly proceeds to a step S53. However, if YES is determined, the process proceeds to the step S53 via processes of steps S49 and S51. The target value table corresponding to the mode information included in the header information is specified in the step S49, and in the step S51, the target value included in the header information is set to the target value table specified in the step S49. In a case that the mode information included in the header information shows "color adjustment mode 1", for example, the target values included in the header information is set to the target value table 22i.

It is determined whether or not the cross key 42 is operated in a step S53, and if the cross key 42 is operated, the process updates the image file regarding the reproduction in a step S55 before returning to the step S45.

Figure 13:
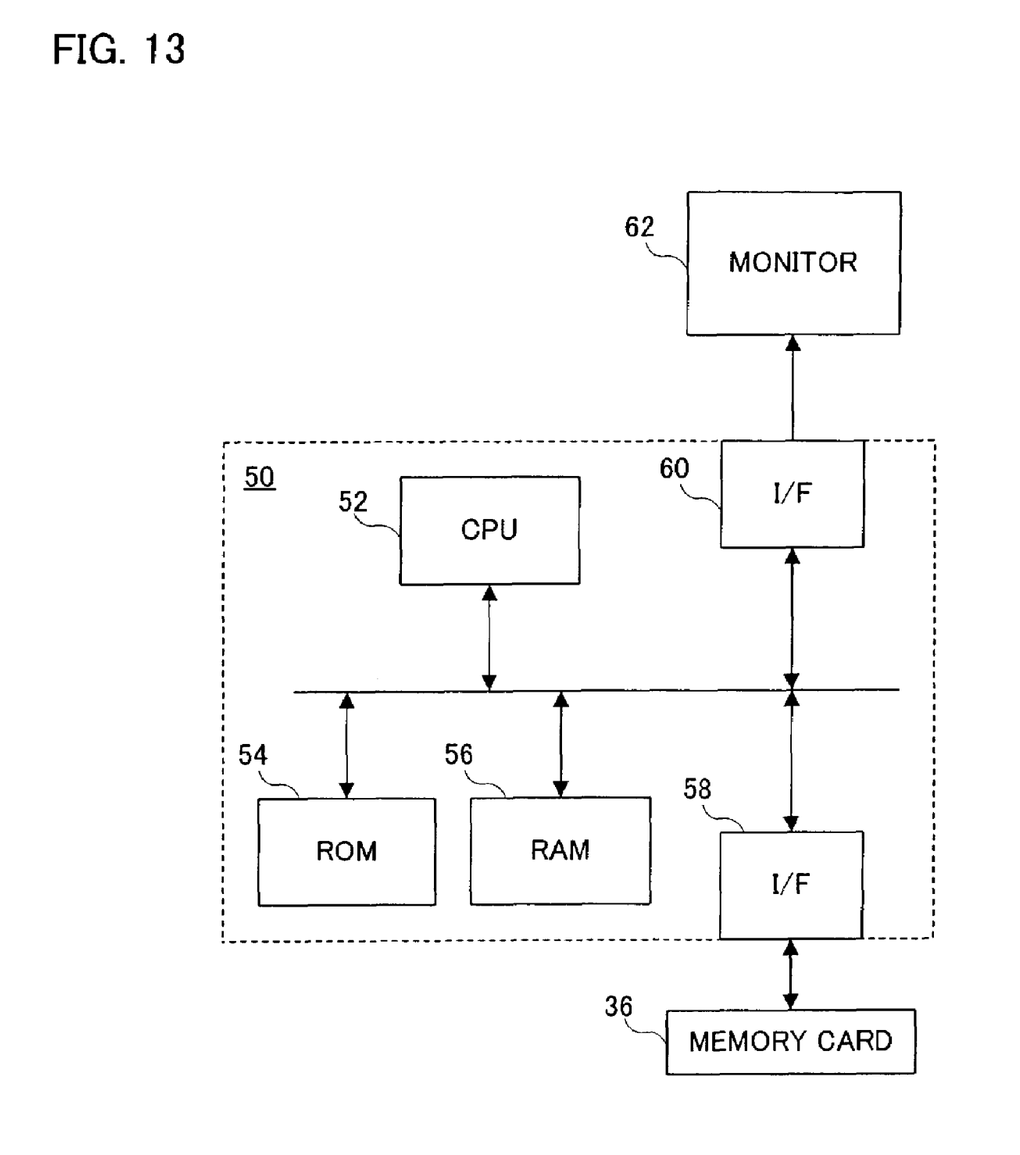
FIG. 13 is a flowchart showing one example of structure of a personal computer.

Referring to FIG. 13, the memory card 36 taken out from the digital camera 10 is attached to the personal computer (PC) 50. Color adjustment program having the same color adjustment function as the digital camera 10 is stored in a ROM 54, and the CPU 52 applies the color adjustment toward each image file recorded in the memory card 36 according to a flowchart shown in FIG. 14 when the color adjustment program is started.

Figure 14:
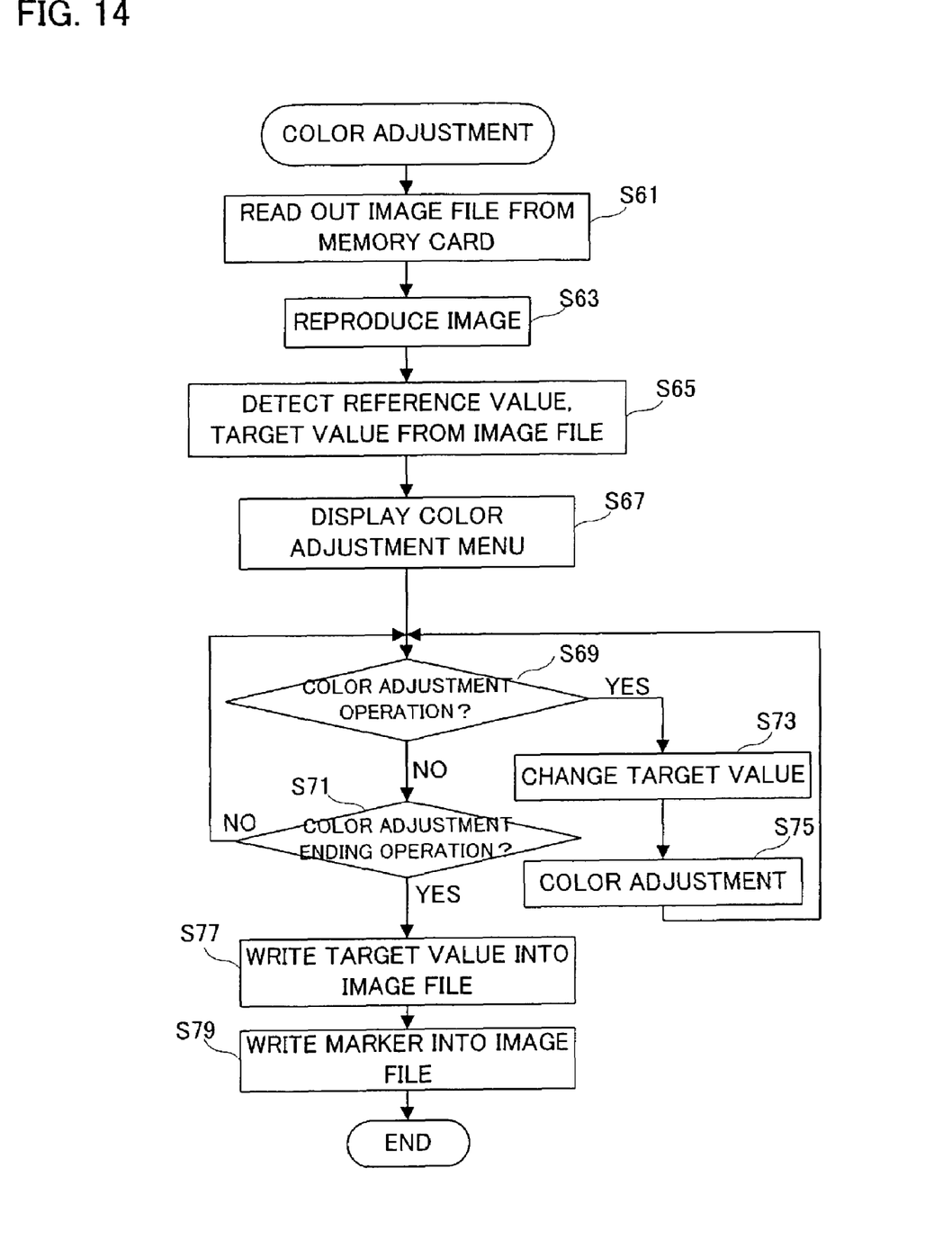
FIG. 14 is a flowchart showing one portion of an operation of the personal computer shown in FIG. 13.

Firstly, a desired image file recorded in the memory card 36 is read out through the I/F circuit 34 in a step S61, and the read image file is written into a RAM 56. The read image file is reproduced in a step S63. More specifically, the JPEG expansion is applied to the compressed image data included in the image file, and the expanded image data is applied to the monitor 62 via the I/F circuit 60. The reproduced image is displayed on the monitor 62. The reference values and the target values are detected from the header information of the image file regarding the reproduction in a step S65, and a color adjustment menu on the basis of the detected reference values and the target values is GUI-displayed on the monitor 62 in a succeeding step S67.

It is determined whether or not the color adjustment is operated in a step S69, and it is determined whether or not a color adjustment ending operation is present in a step S71. When the color adjustment operation is performed, the target values are changed in a step S73, and the color adjustment is carried out on the basis of the changed target values in a step S75. More specifically, the area determination is carried out according to the same manner as in the flowchart shown in FIG. 7 with respect to each pixel forming the reproduced image so as to change the hue, the chroma, and the luminance of the pixel to be noticed on the basis of the two reference values and the two target values specified thereby. As a result, a color reproduction characteristic of the reproduced image is changed.

When the color adjustment ending operation is performed, the process proceeds from the step S71 to a step S77 so as to write the target values changed in the step S73 into the image file regarding the reproduction. More specifically, the target values included in the header information of the image file regarding the reproduction is updated by the target values changed in the step S73. A marker is written into the header information of the same image file in a step S79 before ending the process. It is noted that when the color adjustment ending operation is performed without changing the target value, the process is ended without circulating the steps of S77 and S79.

As understood from the above descriptions, the image data of the object photographed in the photographing mode is subjected to the color adjustment on the basis of the reference values set to the reference value table 22*m* and the target values set to any one of the target value tables 22*i*-22*k* (table corresponding to the current color adjustment mode). The through image on the basis of the image data to which the color adjustment is applied is displayed on the monitor 30. When the shutter button 40 is operated, the compressed image data is generated by the JPEG CODEC 32, the header information including the aforementioned reference values and the target values, and the mode information showing the current color adjustment mode is generated by the CPU 38, and the image file including the header information and the compressed image data is recorded into the memory card 36 by the CPU 32.

In the reproduction mode, it is determined by the CPU 38 whether or not the target values included in the image file is changed. The specific marker is included in the header information of the image file having the changed target values so that whether or not the target values are changed is determined on the basis of the specific marker. If the specific marker is detected, the CPU 38 specifies the target value table corresponding to the mode information included in the same header information, and overwrites the target values of the target value table by the changed target values.

Thus, the reference values and the target values corresponding to the current color adjustment mode, together with the compressed image data, are stored in the image file. Accordingly, if the image file is transferred to the PC 50, it is possible to adjust the color reproduction characteristic of the image on the basis of the compressed image data, and change the target values in accordance with the adjustment. If the target values are thus changed, the target values of the corresponding target value table is overwritten by the changed color adjustment values, and the changed target values are reflected on the color adjustment of the image data. That is, it becomes possible to exactly adjust the color reproduction characteristic of the photographed image data as a result of a mechanism recording the target values into the image file and a mechanism overwriting the target values set to the target value table by the target values within the image file.

It is noted that in this embodiment, a detachable memory card is used as a recording medium. However, the recording medium may be an incorporated type. In this case, the image file may be fetched into the PC by connecting the PC with the digital camera by a cable.

Furthermore, in this embodiment, the parameter adjustable by the PC is only a parameter regarding the color adjustment. However, an image quality other than the color may be adjusted by the PC if a gamma corrected value or a setting value of a dynamic range is to be included in the image file.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A digital camera that subjects a photographed image signal to an image quality adjustment process on the basis of an image quality adjustment value set to a memory, comprising:

a recorder for recording into a recording medium an image file including the photographed image signal which has been subject to the image quality adjustment process and the image quality adjustment value set to said memory upon receipt of a recording instruction, wherein said image quality adjustment value stored on said recording medium is capable of being transferred with said image file to another device;

a determiner for determining whether or not the image quality adjustment value included in said image file is changed; and an overwriter for overwriting the image quality adjustment value set to said memory with the image quality adjustment value included in said image file depending upon a determination result of said determiner so as to reflect a new written image quality adjustment value on the image quality adjustment process which is directed to a photographed image signal to be obtained after an over-writing process.

2. A digital camera according to claim 1, wherein said determiner determines that said image quality adjustment value is changed when a specific marker is included in said image file.

3. A digital camera according to claim 1, wherein a plurality of the image quality adjustment values which respectively correspond to a plurality of image quality adjustment modes are set to said memory, said recorder includes a creator for creating a file header including image quality adjustment mode information and the image quality adjustment value, and a file recorder for recording into said recording medium an image file including the file header and the photographed image signal, and said overwriter includes a specifier for specifying the image quality adjustment value to be overwritten from said memory on the basis of the image quality adjustment mode information included in the file header, an image quality adjustment value overwriter for overwriting the image quality adjustment value specified by said specifier by the image quality adjustment value included in said file header.

4. A digital camera according to claim 1, wherein said recording medium is detachable.

5. A digital camera according to claim 1, wherein said another device is a computer.

6. An image quality control method of a digital camera that subjects a photographed image signal to an image quality adjustment process on the basis of an image quality adjustment value set to a memory, comprising the steps of:

(a) recording into a recording medium an image file including the photographed image signal which has been subject to the image quality adjustment process and the image quality adjustment value set to said memory upon receipt of a recording instruction, wherein said image quality adjustment value stored on said recording medium is capable of being transferred with said image file to another device;

(b) determining whether or not the image quality adjustment value included in said image file is changed; and (c) overwriting the image quality adjustment value set to said memory with the image quality adjustment value included in said image file depending upon a determination result of said step (b) so as to reflect a new written image quality adjustment value on the image quality adjustment process which is directed to a photographed image signal to be obtained after an over-writing process.

7. An image quality control method according to claim 6, wherein said another device is a computer.

8. A digital camera, comprising:
an imaging device for creating an object scene image;
a memory for storing an image quality adjusting value;
an adjuster for adjusting an image quality of the object scene image created by said imaging device based on the image quality adjusting value stored in said memory;
a recorder for recording to a recording medium an image file including the object scene image having the image quality adjusted by said adjuster and the image quality adjusting value stored in said memory in case of accepting a recording instruction;
an accepter for accepting a selecting operation to select a specific image file including a specific image quality adjusting value changed by an external apparatus from among image files recorded in said recording medium in association with a setting of a specific mode;
a reproducer for reproducing the object scene image included in the specific image file selected by said selecting operation; and
an over-writer for writing the specific image quality adjusting value included in the specific image file noted by said reproducer over the image quality adjusting value stored in said memory so as to reflect the specific image quality adjusting value on an adjusting process of said adjuster which is directed to an object scene image to be created by said imaging device after an over-writing process.

9. A digital camera according to claim 8, further comprising a determiner for determining whether or not the image file selected by said selecting operation is the specific image file, wherein said over-writer carries out a writing process when a determination result of said determiner is affirmative.

10. A digital camera according to claim 9, wherein said reproducer carries out a reproducing process without respect to the determination result of said determiner.

11. A digital camera according to claim 9, wherein the specific image file has a specific marker, and said determiner carries out a determining process in reference to the specific marker.

12. A digital camera according to claim 8, wherein said memory stores a plurality of the image quality adjusting values respectively corresponding to a plurality of image quality adjusting modes, said recorder includes a creator for creating a file header including image quality adjusting mode information and an image quality adjusting value which are corresponding to each other, and a file recorder for recording to said recording medium the image file including the file header and the object scene image, and said over-writer includes a specifier for specifying an image quality adjusting value to be overwritten from among the plurality of image quality adjusting values stored in said memory based on the image quality adjusting mode information included in the file header, and an image quality adjusting value over-writer for writing the image quality adjusting value included in the file header over the image quality adjusting value specified by said specifier.

13. A digital camera according to claim 8, wherein the object scene image included in the specific image file has an image quality based on the specific image quality adjusting value.

14. A digital camera according to claim 8, wherein said recording medium is detachable, and said external apparatus is an apparatus capable of attaching said recording medium.

* * * * *